(12) United States Patent
Kuo et al.

(10) Patent No.: US 6,265,520 B1
(45) Date of Patent: Jul. 24, 2001

(54) SOLVENT SOLUBLE POLYIMIDE AND A METHOD FOR MAKING THEREOF

(75) Inventors: Hui-Lung Kuo, Taipei; Chein-Dhau Lee; Yi-Chun Liu, both of Hsinchu Hsien; Shih-Chi Yang, Taoyuan Hsien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/450,901

(22) Filed: Nov. 29, 1999

(51) Int. Cl.$^7$ .................... C08G 73/10; C08G 69/26
(52) U.S. Cl. .................. 528/170; 528/125; 528/126; 528/128; 528/172; 528/173; 528/176; 528/179; 528/183; 528/188; 528/220; 528/229; 528/350; 528/351; 528/352; 528/353
(58) Field of Search .................... 528/125, 126, 528/128, 170, 176, 172, 179, 173, 183, 353, 188, 220, 229, 350, 351, 352

(56) References Cited

U.S. PATENT DOCUMENTS

| 5,229,485 | * | 7/1993 | Kramer et al. | 528/173 |
| 6,013,760 | * | 1/2000 | Choi et al. | 528/173 |
| 6,031,067 | * | 2/2000 | Choi et al. | 528/353 |
| 6,054,554 | * | 4/2000 | Choi et al. | 528/353 |
| 6,100,365 | * | 8/2000 | Matsumoto et al. | 528/170 |

FOREIGN PATENT DOCUMENTS 59-179623 * 10/1984 (JP).
60-135430A * 7/1985 (JP).

* cited by examiner

Primary Examiner—P. Hampton-Hightower
(74) Attorney, Agent, or Firm—Ladas & Parry

(57) ABSTRACT

Disclosed is a solvent soluble polyimide and a method for making thereof, which characterizes by producing a solvent soluble polyimide with low electric conductivity through the polymerization of an anhydride and a diamine under the condition with or without catalyst.

19 Claims, No Drawings

SOLVENT SOLUBLE POLYIMIDE AND A METHOD FOR MAKING THEREOF

FIELD OF THE INVENTION

The invention relates to a solvent soluble polyimide used as the material of the alignment layer of a LCD and a method for making thereof.

BACKGROUND OF THE INVENTION

The commercial material of the alignment layer of the LCD is based on a so-called polyimide (PI), however the conventional polyamide is a material that is nearly insoluble, unmelting, thermal-resistant and chemical-resistant. It is very inconvenient for this polyimide to be processed, and in particular applied in making the alignment layer of the LCD.

Conventional aromatic polyimides have good thermal resistance, and these polyimides are usually obtained from the condensation products of aromatic anhydrides or derivatives and aromatic diamines. First, the polyamidic acid is synthesized. Then, a crosslinked imidization is performed under a high temperature to produce the desired polyimide.

The commercial kit of the alignment layer is usually sold in the form of solution containing the intermediates of the reaction used to synthesize the desired polyamide. First, this solution is coated on a substrate, then the substrate is exposed to a high temperature to allow the polyamidic acid cyclize partially or entirely. The polyamidic acid is not a stable substance, so it will easily decompose into low M.W. substances. Therefore, the product composed of this polyimide is not stable. Accordingly, the usages of the conventional polyimides are limited by their preservation (short retention time and low temperature preservation) and cost.

In addition, the process needs a high-temperature long-term baking; therefore, the conductive layer on the substrate is easily oxidized, resulting in the increase at the operating voltage and power consumption. Moreover, the high-temperature baking makes it hard to fabricate the color filter.

A method for making a polyimide synthesized through the intermediate polyamidic acid polymerized by aliphatic anhydrides and diamines was disclosed by Hitachi Chem. Co. Ltd. (Japan unexamined Patent No. 60-135430). However, this method can not provide useful solvent soluble polyimides.

Similarly, a method for making a solvent soluble polyimide by selecting suitable monomers and assembly thereof was disclosed by Hitachi Chem. Co. Ltd. (Japan unexamined Patent No. 59-179623). Unfortunately, the polyimide film appears dark, which is adverse to optical transparency. Accordingly, the polyamides made according to this method can not be used as the material of the alignment layer of the LCD.

In accordance, it is necessary to develop a solvent soluble polyimide, which can be well preserved and used, to make a product with good electric conductivity and stability, and in particular the material of the alignment layer of the LCD.

SUMMARY OF THE INVENTION

Disclosed is a solvent soluble polyamide and a method for making thereof. This invention is characterized by polymerizing the anhydride selected from one or more member(s) of the group consisting of the compounds with following formula (AD1~AD3):

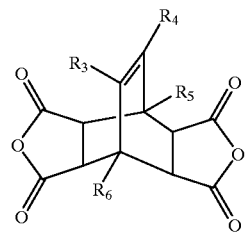
(AD1)

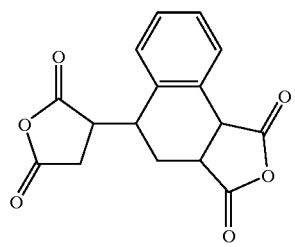
(AD2)

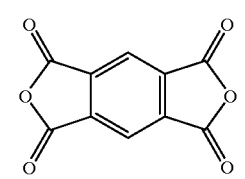
(AD3)

wherein, $R_3$, $R_4$, $R_5$ and $R_6$ of AD1 are independent hydrogen and methyl; with diamine selected from one or more member(s) of the group consisting of the compounds with following formula (AM1~AM5):

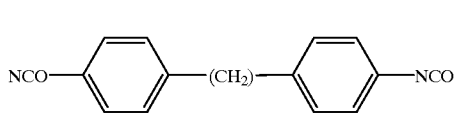
(AM1)

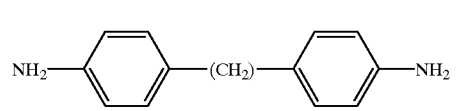
(AM2)

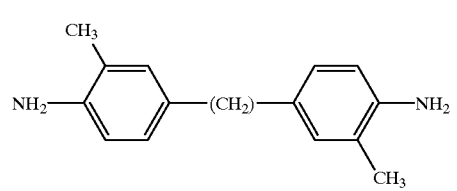
(AM3)

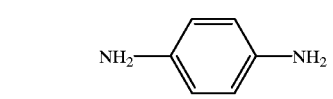
(AM4)

-continued (AM5)

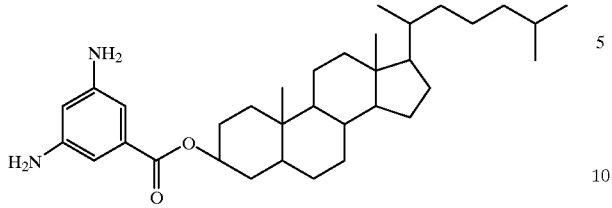

under the condition without or with catalyst (tri-ethyl amine, quinoline, pyridine, phosphoric anhydride, tri-chloro phosphate, phosphorous trichloride, p-methyl benzene-sulfonic acid, sulfuric acid, phosphoric acid, high-M.W. acidic catalyst and high-M.W. basic catalyst) to produce a novel solvent soluble polyimide with low electric conductivity and good transparency.

This polymerization is shown in following Scheme I:

Scheme I

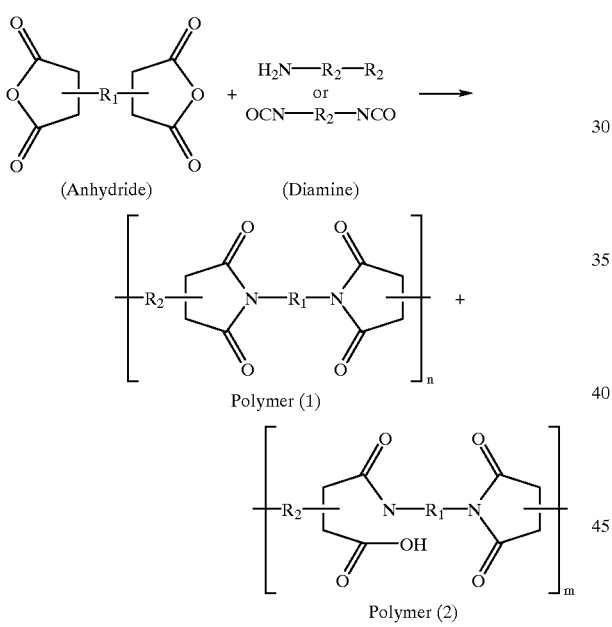

As shown in Scheme I, the Polymer (I) is the major product of this polymerization, which can be directly used as a material of the alignment layer of a LCD; the Polymer (II) is the minor product of this polymerization, which can be converted to Polymer (I) through cyclization reaction.

Other feature and advantages of the invention will be apparent from the following detailed description, and from the claims.

DETAILED DESCRIPTION OF THE INVENTION

One feature of the invention discloses a solvent soluble polyamide of formula (I):

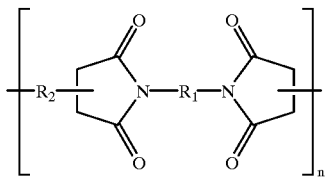

(1)

wherein, $R_1$ is:

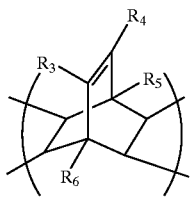

and $R_3$, $R_4$, $R_5$, $R_6$ are independently selected from the group consisting of hydrogen and methyl group; and/or $R_1$ is

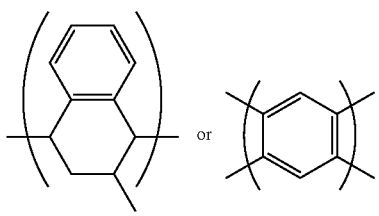

$R_2$ is

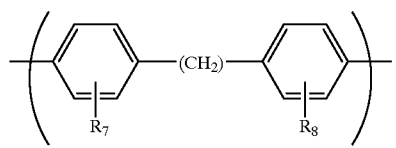

wherein, $R_7$ and $R_8$ are independently hydrogen or methyl; and/or $R_2$ is:

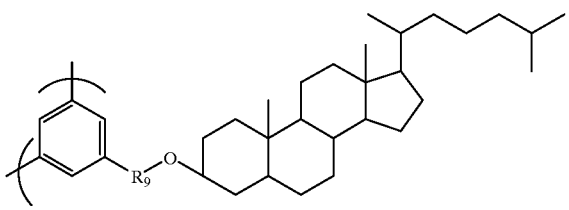

wherein, $R_9$ is —C(O)— or —CH—; and/or $R_2$ is:

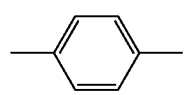

and n is an integer.

Another feature of the invention discloses a method for making a solvent soluble polyimide, the steps comprising:

a) providing a diamine placed in a reactor;
b) introducing a suitable solvent to the reactor;
c) adding an anhydride to the reactor, and healing at a temperature for a period of time allowing the polymerization of the anhydride and the diamine to produce a polyimide of formula (I):

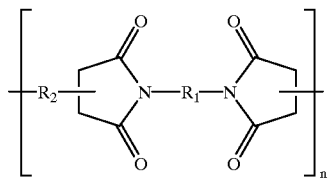
(1)

wherein, $R_1$ is:

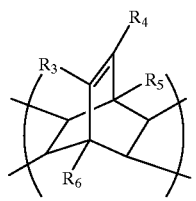

and $R_3$, $R_4$, $R_5$, $R_6$ are independently selected from the group consisting of hydrogen and methyl group; and/or $R_1$ is

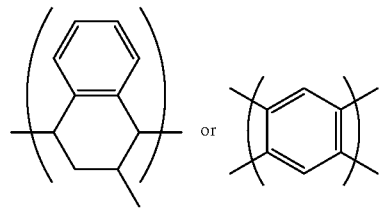

$R_2$ is

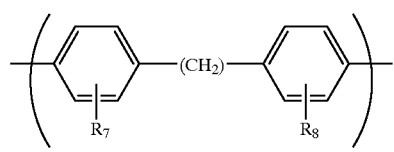

wherein $R_7$ and $R_8$ are independently hydrogen or methyl; and/or $R_2$ is:

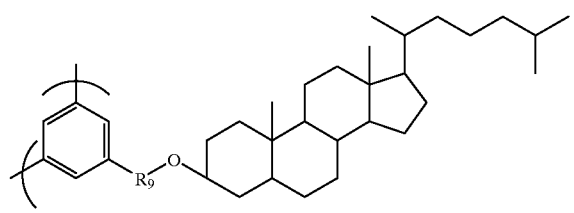

wherein, $R_9$ is —C(O)— or —CH$_2$—; and/or $R_2$ is:

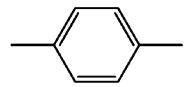

and n is an integer.

As the method described above, the diamine is selected from one or more member(s) of the group consisting of following compounds (AM1~AM5):

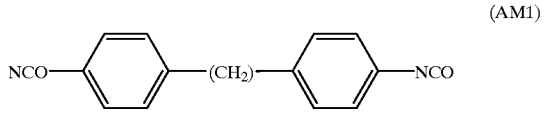
(AM1)

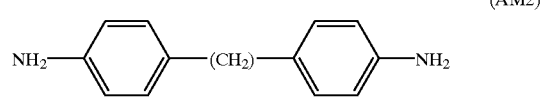
(AM2)

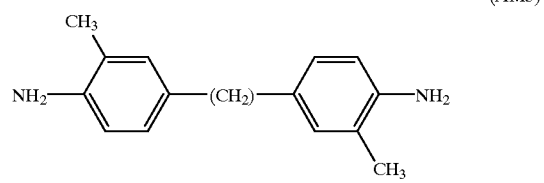
(AM3)

(AM4)

(AM5)

The anhydride is selected from one or more member(s) of the group consisting of AD1, AD2 and AD3:

wherein, $R_3$, $R_4$; $R_5$ and $R_6$ of AD1 are independent hydrogen

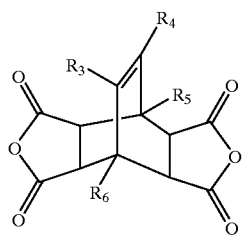
(AD1)

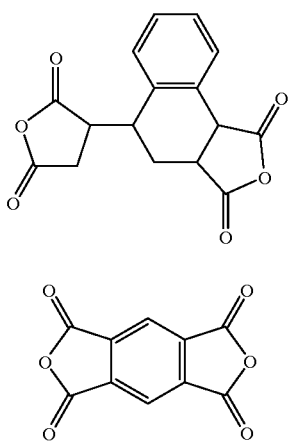

(AD2)

(AD3)

or methyl.

The solvent is selected from one of the group consisting of butoxyethanol, γ-lactone, N-methyl-γ-lactone, ethylene glycol, di-ethyl-diol, and meta-methyl phenol.

Furthermore, the steps b) further comprises introducing a catalyst, selected from one or more member(s) of the group consisting of tri-ethyl amine, quinoline, pyridine, phosphoric anhydride, tri-chloro phosphate, phosphorous trichloride, p-methyl benzenesulfonic acid, sulfuric acid, phosphoric acid, high-M.W. acidic catalyst and high-M.W. basic catalyst, into the reactor under $N_2$ with a stirring to dissolve the catalyst.

The ratio of the diamine and the anhydride ranges from 0.8 to 1.2. The amount of the added catalyst is 0.1%~3% of the total weight of the diamine and the anhydride. Moreover, step c) is performed at a temperature ranging from 50° C. to 220° C. for 3 hours to 36 hours, preferably at a temperature ranging from 100° C. to 180° C. for 5 hours to 24 hours.

EMBODIMENT OF THE INVENTION

The following examples were accomplished according to the method disclosed in this present invention. Accordingly, one or more anhydride(s) (AD1~AD3) and diamino(s) (AM1~AM5) were polymerized without or with the catalyst (tri-ethyl amine, quinoline, pyridine, phosphoric anhydride, tri-chloro phosphate, phosphorous trichloride, p-methyl benzenesulfonic acid, sulfuric acid, phosphoric acid, high-M.W. acidic catalyst and hiqh-M.W. basic catalyst) to produced a solvent soluble polyimide. The viscosity and the Pretilted angle of each obtained polyimide was measured.

EXAMPLE 1

Two diamines, AM4 (6.12 g) and AM5 (1.56 g), were introduced to a reactor. Then, anhydrous N-methyl pyrrolidone (NMP, 77.5 g) and tri-ethyl amine (0.5 g) were added to the reactor under $N_2$. Stirring until the anhydrous N-methyl pyrrolidone and tri-ethyl amine were dissolved, an anhydride of formula AD1 (14.78 g) was added and heated at a temperature ranging from 20~25° C. for 60 hours. Finally, a polyimide solution was obtained. Viscosity: 45 cps (solvent: NMP, solid content: 15%); Pretilted angle: Non-detected.

EXAMPLE 2

Two diamines, AM3 (13.69 g) and AM5 (0.99 g), were introduced to a reactor. Then, meta-methyl phenol (120 g) and quinoline (2.0 g) were added to the reactor under $N_2$. Stirring until the meta-methyl phenol and quinoline were dissolved, an anhydride of formula AD1 (16.9 g) was added in two steps and heated at a temperature ranging from 50~170° C. for 3 hours. Finally, a polyimide solution was obtained. Viscosity: 10 cps (solvent: NMP, solid content: 15%); Pretilted angle: 5.1°.

EXAMPLE 3

Two diamines, AM2 (13.69 g) and AM5 (0.99 g), were introduced to a reactor. Then, meta-methyl phenol (120 g) and quinoline (2.0 g) were added to the reactor under $N_2$. Stirring until the meta-methyl phenol and quinoline were dissolved, an anhydride of formula AD1 (15.32 g) was added in two steps and heated at a temperature ranging from 50~170° C. for 3 hours. Finally, a polyimide solution was obtained. Viscosity: 28.4 cps (solvent: NMP, solid content: 15%); Pretilted angle:

EXAMPLE 4

Two diamines, AM2 (11.42 g) and AM5 (0.93 g), were introduced to a reactor. Then, meta-methyl phenol (120 g) and quinoline (2.0 g) were added to the reactor under $N_2$. Stirring until the meta-methyl phenol and quinoline were dissolved, an anhydride of formula AD1 (17.69 g) was added in two steps and heated at a temperature ranging from 50~170° C. for 3 hours. Finally, a polyimide solution was obtained. Viscosity: 10 cps (solvent: NMP, solid content: 15%); Pretilted angle: Non-detected.

EXAMPLE 5

A diamine, AM3 (11.81 g), was introduced to a reactor. Then, 4-γ-lactone (140 g) and Amerlyst-15 (3.34 g) were added to the reactor under $N_2$. Stirring until the 4-γ-lactone and Amerlyst-15 were dissolved, an anhydride of formula AD1 (12.94 g) was added in three steps and reacted at room-temperature for 24 hours. After the viscosity of the reaction mixture reached 3.33 cps (solvent: 4-γ-lactone, solid content: 4.5%), phosphoric anhydride (1.5 g) was added and further reacted at room-temperature for 1 hour. Finally, a polyimide solution was obtained. Viscosity: 4.3 cps (solvent: 4-γ-lactone, solid content: 4.5%); Pretilted angle: Non-detected.

EXAMPLE 6

A diamine, AM3 (13.69 g), was introduced to a reactor. Then, DMAc (94.4 g) was added to the reactor under $N_2$. Stirring until the DMAc was dissolved, an anhydride of formula AD1 (16.92 g) was added in three steps and reacted at room-temperature for 15 hours. After the viscosity of the reaction mixture reached 2.75 cps (solvent: DMAc, solid content: 4.5%), the mixture was heated to 120° C., then cooled to room-temperature, and reacted a further 24 hours. Finally, a polyamide solution was obtained. Viscosity: 5.45 cps (solvent: DMAc, solid content: 4.5%); Pretilted angle: Non-detected.

EXAMPLE 7

A diamine, AM3 (14.26 g), was introduced to a reactor. Then, m-toluene (125 g) was added to the reactor under $N_2$. Stirring until the m-toluene was dissolved, toluene (60 g) and quinoline (2.0 g) were added, and heated to 100° C. Then, an anhydride of formula AD1 (15.7 g) was added in three steps and reacted at a temperature ranging from 50° C. to 170° C. for 14 hours. Finally, a polyimide solution was obtained. Viscosity: 46.6 cps (solvent: 4-γ-lactone, solid content: 4.5%); Pretilted angle: Non-detected.

EXAMPLE 8

Two diamines, AM3 (14.26 g)and AM5 (1.02 g ), were introduced to a reactor. Next, m-toluene (125 g) was added to the reactor under $N_2$. Stirring until the m-toluene was dissolved, toluene (60 g)and quinoline (2.0 g) were added, and heated to 50° C. Then, an anhydride of formula AD1 (16.15 g ) was added in three steps and reacted at a temperature ranging from 50° C. to 170° C. for 5 hours. Finally, a polyimide solution was obtained. Viscosity: 39.5 cps (solvent: 4-γ-lactone, solid content: 4.5%); Pretilted angle: 4.3°.

EXAMPLE 9

Two diamines, AM3 (216.12 g) and AM5 (31.85 g ), were introduced to a reactor. Next, m-toluene (1678 g) was added to the reactor under $N_2$. Stirring until the m-toluene was dissolved, toluene (560 g) and quinoline (40 g) were added, and heated to 50° C. Then, an anhydride of formula AD1 (252.07 g) was added in three steps and reacted at a temperature ranging from 50° C. to 170° C. for 5 hours. Finally, a polyimide solution was obtained. Viscosity: 28.4 cps (solvent: γ-lactone, solid content: 4.5%); Pretilted angle: 7.3°; Residual voltage: 0.04V.

EXAMPLE 10

A diamine, AM3 (34.57 g), was introduced to a reactor. Next, NMP (300 g) and toluene (60 g) were added to the reactor under $N_2$. Stirring until the NMP and toluene were dissolved, the anhydride of formula AD1 (36.08 g) was added, and heated at a temperature ranging from 50° C. to 170° C. for 15 hours. Then, an anhydride of formula AD1 (16.15 g) was added in three steps and reacted at a temperature ranging from 50° C. to 170° C. for 5 hours. Finally, a polyimide solution was obtained. Viscosity: 39.5 cps (solvent: 4-γ-lactone, solid content: 4.5%); Pretilted angle: 4.3°.

EXAMPLE 11

Two diamines, AM3 (27.08 g)and AM5 (3.99 g), were introduced to a reactor. Next, NMP (240 g) and toluene (50 g) was added to the reactor under $N_2$. Stirring until the NMP and toluene were dissolved, a anhydride of formula AD1 (3.0 g) and AD3 (2.77 g) were added, and heated at 180° C. or 15 hours. Finally, a polyimide solution was obtained. Viscosity: 157 cps (solvent: NMP, solid content: 6.5%) ; Pretilted angle: 6.8°.

EXAMPLE 12

Two diamines, AM3 (27.08 g) and AM5 (3.99 g), were introduced to a reactor. Next, NMP (240 g) and toluene (50 g) was added to the reactor under $N_2$. Stirring until the NMP and toluene were dissolved, a anhydride of formula AD1 (30.0 g) and AD3 (2.77 g) were added, and heated at 180° C. for 15 hours. Finally, a polyimide solution was obtained. Viscosity: 47.3 cps (solvent: NMP, solid content:4.5%); Pretilted angle: 6.8°.

From the above description, one skilled in this art can easily ascertain the essential characteristics of the present invention, and, without departing from the spirit and scope thereof, can make various changes and modifications of the invention to adapt it to various usage and conditions. Thus, other embodiments also fall within the scope of the following claims.

What is claimed is:
1. A solvent soluble polyimide of formula I:

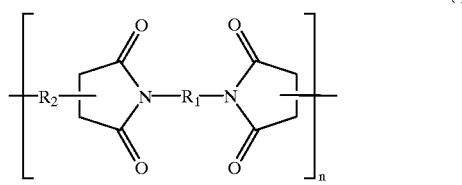

wherein, $R_1$ is:

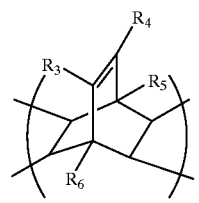

and $R_3$, $R_4$, $R_5$, $R_6$ are independently selected from the group consisting of hydrogen and methyl group; and/or $R_1$ is

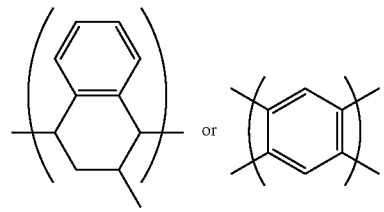

$R_2$ is

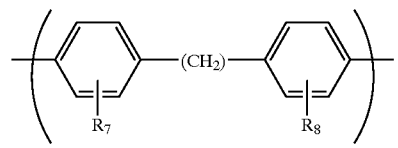

wherein, $R_7$ and $R_8$ are independently hydrogen or methyl; and/or $R_2$ is:

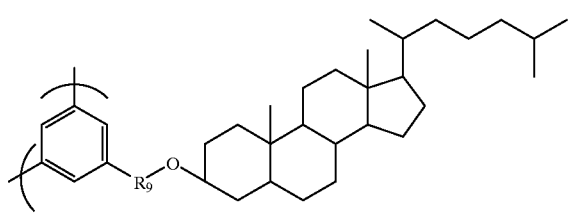

wherein, $R_9$ is —C(O)— or —$CH_2$—; and/or $R_2$ is:

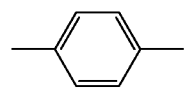

and n is an integer.

2. A method for fabricating a solvent soluble polyimide, the steps comprising:

a) providing a diamine in a reactor;
b) introducing a solvent to the reactor;
c) adding an anhydride to the reactor, and heating at a temperature for a period of time allowing the polymerization of the anhydride and the diamine to produce a polyimide of formula (I):

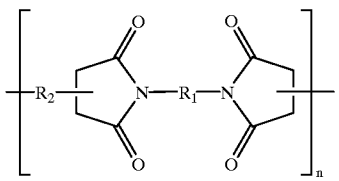
(I)

wherein, $R_1$ is:

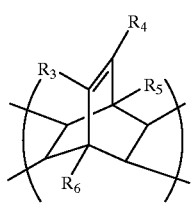

and $R_3$, $R_4$, $R_5$, $R_6$ are independently selected from the group consisting of hydrogen and methyl group; and/or $R_1$ is

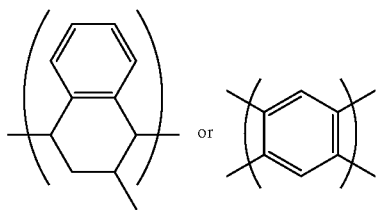

$R_2$ is

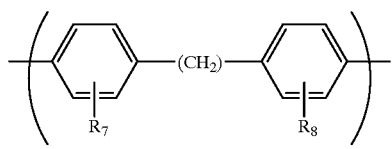

wherein, $R_7$ and $R_8$ are independently hydrogen or methyl; and/or $R_2$ is:

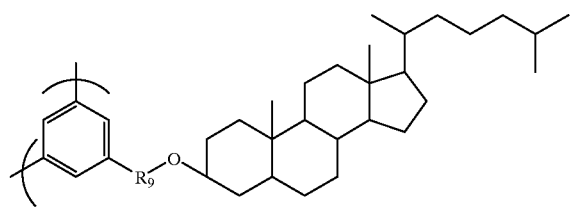

wherein, $R_9$ is —C(O)— or —CH$_2$—; and/or $R_2$ is:

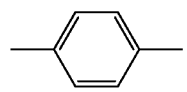

and n is an integer.

3. The method as claimed in claim 2, wherein the diamine is selected from one or more member(s) of the group consisting of following compounds (AM1~AM5):

(AM1)

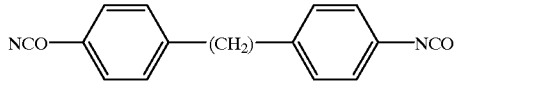
(AM2)

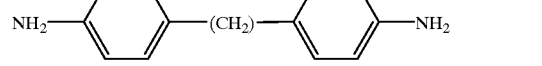
(AM3)

(AM4)
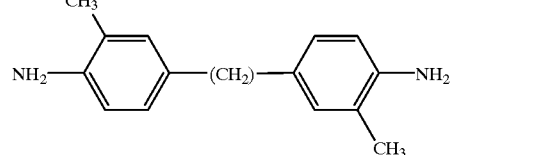

(AM5)
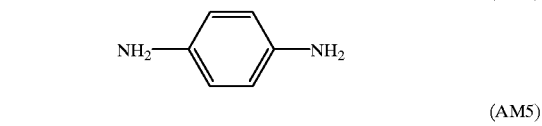

4. The method as claimed in claim 2, wherein the solvent is selected from one of the group consisting of butoxyethanol, γ-lactone, N-methylpyrrolidone, ethylene glycol, di(ethylene glycol), and meta-methyl phenol.

5. The method as claimed in claim 2, wherein the anhydride is selected from one or more member(s) of the group consisting of AD1, AD2 and AD3:

(AD1)
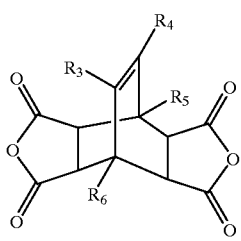

-continued (AD2)

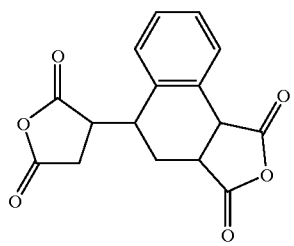

(AD3)

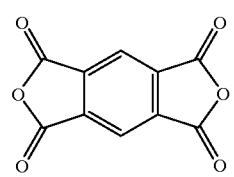

wherein, R₃, R₄, R₅ and R₆ of AD1 are independent hydrogen or methyl.

6. The method as claimed in claim 2, wherein the ratio of the diamine and the anhydride ranges from 0.8 to 1.2.

7. The method as claimed in claim 2, the step b) further comprises introducing a catalyst, selected from one or more member(s) of the group consisting of tri-ethyl amine, quinoline, pyridine, phosphoric anhydride, tri-chloro phosphate, phosphorous trichloride, p-methyl benzene-sulfonic acid, sulfuric acid, phosphoric acid, high-M.W. acidic catalyst and high-M.W. basic catalyst, into the reactor under $N_2$ with a stirring to dissolve the catalyst.

8. The method as claimed in claim 6, wherein the amount of the added catalyst is 0.1%~3% of the total weight of the diamine and the anhydride.

9. The method as claimed in claim 2, wherein the reaction temperature of step c) ranges from room-temperature to 220° C.

10. The method as claimed in claim 7, wherein the reaction time of step c) ranges from 2 hours to 72 hours.

11. A method for fabricating a solvent soluble polyimide, the method comprising steps of:

(a) providing a diamine in a reactor;

(b) introducing a polar solvent to the reactor;

(c) adding an anhydride to the reactor and heating at a temperature for a period of time allowing polymerization of the anhydride and the diamine to produce a polyimide of formula (I), (I)

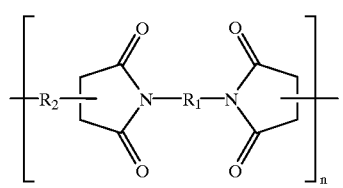

wherein $R_1$ is

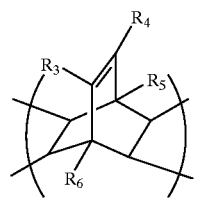

and $R_3$, $R_4$, $R_5$, $R_6$ are independently selected from the group consisting of hydrogen and methyl group; and/or $R_1$ is

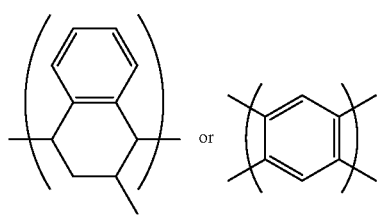

$R_2$ is

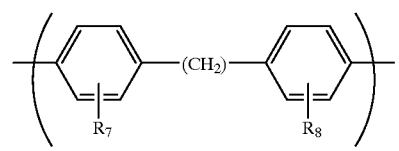

wherein $R_7$ and $R_8$, are independently hydrogen or methyl; and/or $R_2$ is

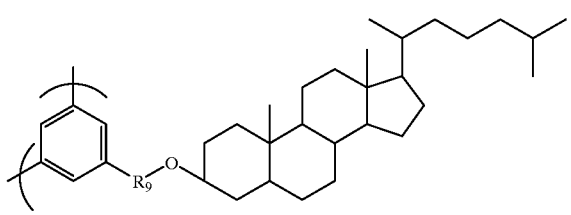

wherein, $R_9$ is —C(O)— or —CH₂—; and/or $R_2$ is

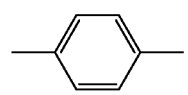

and n is an integer.

12. The method as claimed in claim 11, wherein the diamine is selected from one or more member(s) of the group consisting of following compounds (AM1–AM5):

(AM1)

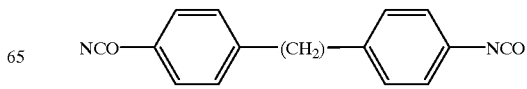

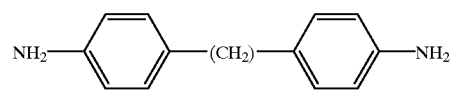
(AM2)

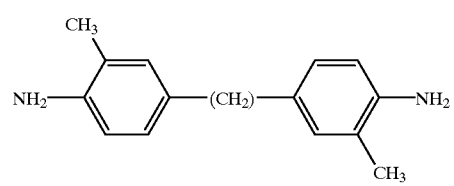
(AM3)

(AM4)

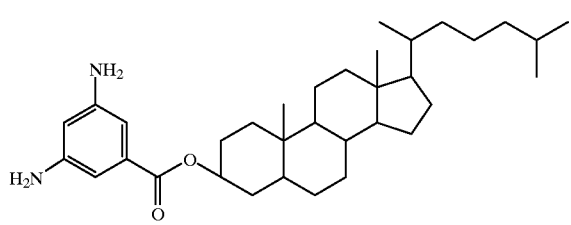
(AM5)

13. The method as claimed in claim 11, wherein the solvent is selected from one of the group consisting of butoxyethanol, y-lactone, N-methylpyrrolidone, ethylene glycol, di(ethylene glycol), and meta-methyl phenol.

14. The method as claimed in claim 11, wherein the anhydride is selected from one or more member(s) of the group consisting of AD1, AD2 and AD3,

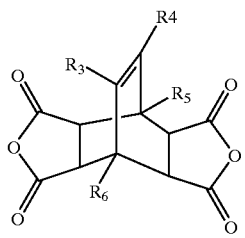
(AD1)

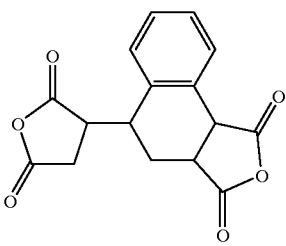
(AD2)

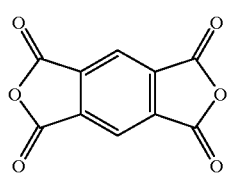
(AD3)

wherein $R_3$, $R_4$, $R_5$ and $R_6$ of AD1 are independent hydrogen or methyl.

15. The method as claimed in claim 11, wherein the ratio of the diamine and the anhydride is within a range of ratios between about 0.8 and about 1.2.

16. The method as claimed in claim 11, the step (b) further comprising introducing a catalyst selected from one or more member(s) of the group consisting of tri-ethyl amine, quinoline, pyridine, phosphoric anhydride, tri-chloro phosphate, phosphorous trichloride, p-methyl benzene-sulfonic acid, sulfuric acid, phosphoric acid, high molecular weight acidic catalyst and high molecular weight basic catalyst, into the reactor under $N_2$ with a stirring to dissolve the catalyst.

17. The method as claimed in claim 15, wherein the amount of the added catalyst is within a range of between about 0.1% and about 3% of the total weight of the diamine and the anhydride.

18. The method as claimed in claim 11, wherein the reaction temperature of step (c) is within a range of between a room temperature and about 220° C.

19. The method as claimed in claim 16, wherein the reaction time of step (c) is within a range of between about 2 hours and about 72 hours.

* * * * *